United States Patent [19]

Imajyo et al.

[11] Patent Number: 4,470,619
[45] Date of Patent: Sep. 11, 1984

[54] AUTOMOBILE SEAT BELT ANCHOR ATTACHMENT STRUCTURE

[75] Inventors: Hideyuki Imajyo; Takashi Mishima, both of Hiroshima, Japan

[73] Assignee: Toyo Kogyo Co., Ltd., Hiroshima, Japan

[21] Appl. No.: 456,499

[22] Filed: Jan. 7, 1983

[30] Foreign Application Priority Data

Jan. 11, 1982 [JP] Japan .............................. 57-1937[U]

[51] Int. Cl.³ ............................................ B62D 25/04
[52] U.S. Cl. ..................................... 280/808; 52/721;
296/29; 296/30; 296/187; 297/483; 410/102
[58] Field of Search ............... 280/808, 801; 296/35.1,
296/35.2, 36, 29, 30, 187; 297/483, 468; 52/721,
730, 238.1, 243.1; 410/153, 102, 106, 108, 109,
110, 112, 113, 114; 105/418, 378

[56] References Cited

U.S. PATENT DOCUMENTS 2,716,561  8/1955  Beran ................................. 297/468
4,316,688  2/1982  Roskelley .......................... 410/102
4,385,475  5/1983  Nakamura ........................ 52/721 X

FOREIGN PATENT DOCUMENTS 791885    4/1960   France ............................... 52/243.1
2081161  12/1971   France .
2230931  12/1974   France .
2350542  12/1977   France .
2386714  11/1978   France .
54-25768  8/1979   Japan .
1306925   2/1973   United Kingdom .

Primary Examiner—Joseph F. Peters, Jr.
Assistant Examiner—Mitchell J. Hill
Attorney, Agent, or Firm—Fleit, Jacobson, Cohn & Price

[57] ABSTRACT

An automobile seat belt anchor attachment structure for attaching a seat belt anchor to a pillar structure, the attachment structure including inner and outer pillar panels which are welded together to form a closed cross-section. The attachment structure further including a stiffening panel secured to the pillar structure and a nut carrying plate secured to the stiffening panel with an anchor attaching nut provided thereon. The nut plate has high strength against forces both perpendicular and parallel to the base of the nut plate. An impact load applied to the anchor attachment, is prevented from deforming the nut plate.

8 Claims, 6 Drawing Figures

AUTOMOBILE SEAT BELT ANCHOR ATTACHMENT STRUCTURE

BACKGROUND OF THE INVENTION

The present invention relates to a seat belt anchor attachment structure provided on an automobile pillar structure.

Conventionally used seat belts for automobiles have one end attached through an anchor to an upper portion of a side pillar structure of the automobile body and the other end extending through a retracting device to a floor member. The pillar structure is of a closed cross-section comprised of inner and outer panels which are welded together. Inside of the pillar structure, there is attached a nut plate having a nut secured thereto and the seat belt anchor is attached to the nut plate. The inner and outer panels are made of sheets of suitable metallic material which have relatively low rigidity, so that they are usually reinforced at the portion where the nut plate is to be installed. For this purpose, a stiffener is conventionally attached to the inner and outer panels of the pillar structure.

Japanese utility model publication No. 54-25768 discloses a nut plate which has a base attached at its inner side with a nut and a pair of side pieces provided along the opposite side edges of the base. The side pieces are generally perpendicular to the base and extend in the direction of the side where the nut is attached, so as to form a generally channel-shaped cross-section. The side pieces extend vertically upwards and downwards beyond the confines of the base and is welded to the side walls of the pillar outer panel. The structure as proposed by this utility model shows a high rigidity against the force perpendicular to the base due to the existence of the side pieces. However, the base has a relatively low buckling resistance and therefore the structure shows a relatively low strength against forces parallel to the base.

SUMMARY OF THE INVENTION

It is therefore an object of the present invention to provide a seat belt anchor attachment structure which has high strengths against the forces both perpendicular to and parallel with the base of the nut plate.

Another object of the present invention is to provide a reliable and strong seat belt anchor attachment structure.

According to the present invention, the above and other objects can be accomplished by a seat belt anchor attachment structure for attaching a seat belt anchor to a pillar structure comprised of inner and outer pillar panels which are welded together to form a closed cross-section, said attachment structure including a stiffening panel means secured to said pillar structure, a nut carrying plate secured to said stiffening panel means and having anchor attaching nut means provided thereon, said plate having a base portion to which said nut means is attached at one side thereof, a side piece provided along one side edge of said base portion at an angle with respect to said base portion and extending toward said one side of the base portion, said side piece having upper and lower end portions extending beyond upper and lower edges of said base portion, upper and lower leg portions extending from said upper and lower edges of said base portion toward said one side thereof, each of said upper and lower leg portions having a side opposite said side piece where it is provided with a first connecting portion extending substantially in parallel with said side piece, each of said upper and lower leg portions further having an end opposite said base portion where it is provided with a second connecting portion extending substantially in parallel with said base portion, the second connecting portion on said upper leg portion extending in a direction opposite to a direction in which said second connecting portion on said lower leg portion extends, at least said side piece and said first and second connecting portions being secured to said stiffening panel means.

According to the structure of the present invention, when an impact load is applied to the base portion in case of a front crash force, the force component perpendicular to the base portion is transmitted through the side piece and the first and second connecting portions to the stiffening panel means which is of a high rigidity. Therefore, it is possible to prevent deformations of the base portion of the nut plate. Against the force component parallel with the base portion, the upper and lower leg portions serve to increase the buckling resistance of the base portion and the second connecting portions serve to reinforce the leg portions. Thus, the rigidity of the nut plate is significantly increased.

BRIEF DESCRIPTION OF THE DRAWINGS

The above and other objects and features of the present invention will become apparent from the following descriptions of preferred embodiments with reference to the accompanying drawings, in which.

DETAILED DESCRIPTION OF THE DRAWINGS

Figure 1:
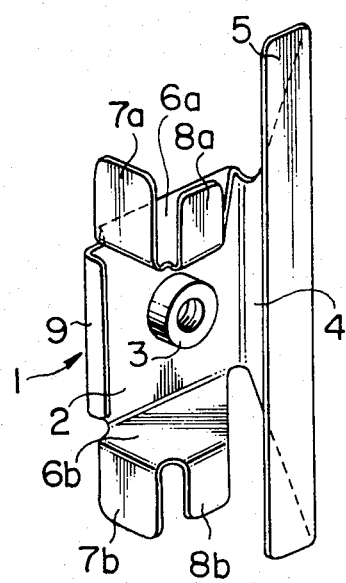
FIG. 1 is a perspective view showing a nut plate in accordance with one embodiment of the present invention.

Referring now to the drawings, particularly to FIG. 1, there is shown a nut plate 1 which includes a base portion 2 having one surface on which an anchor nut 3 is mounted. The base portion 2 has a side edge which is integral with a side piece 4 extending substantially perpendicularly to the base portion 2 in the direction of the aforementioned one surface having the anchor nut 3 thereon. The side piece 4 extends vertically upwards and downwards beyond the confines of the base portion 2. Further, the side piece 4 is bent at its outer edge toward the same side as the base portion 2 to form a flange 5 parallel with the base portion 2.

The base portion 2 is further integral with leg portions 6a and 6b which are substantially perpendicular to the base portion 2 and extend respectively from the upper and lower edges of the base portion 2. The leg portions 6a and 6b respectively have sides opposite the side piece 4 which are formed with first connecting tabs 7a and 7b, respectively. The connecting tab 7a on the leg portion 6a extends upwardly whereas the connecting tab 7b on the leg portions 6b extends downwardly.

The tabs 7a and 7b are substantially parallel with the side piece 4. The leg portion 6a is formed at its outer edge with a second connecting tab 8a which is substantially parallel with the base portion 2 and extends vertically upwardly. Similarly, the leg portion 6b is formed with a second connecting portion 8b which is substantially parallel with the base portion 2 and extends vertically downwardly. At the side opposite the side piece 4, the base portion 2 is formed with a reinforcing edge 9 which is substantially parallel with the side piece 4.

Figure 2:
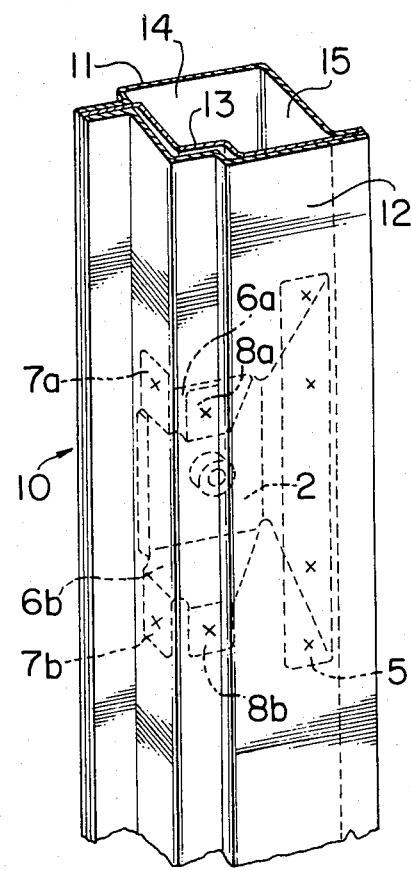
FIG. 2 is a perspective view of a pillar structure showing the nut plate attached to the pillar structure.
Figure 3:
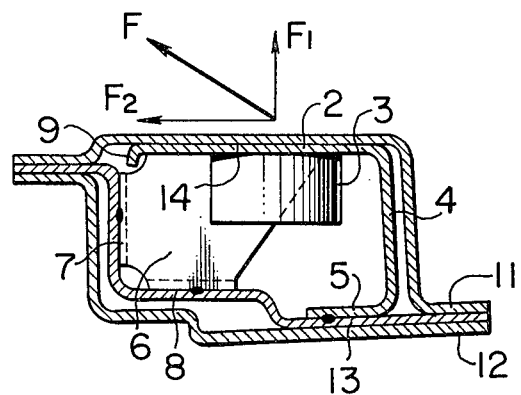
FIG. 3 is a sectional view of the pillar structure shown in FIG. 2.

Referring now to FIGS. 2 and 3, there is shown a pillar structure 10 to which the aforedescribed nut plate 1 is attached. The pillar structure 10 is comprised of an inner panel 11 and an outer panel 12 which are welded together to form a closed cross-section with a stiffener 13 interposed therebetween. As shown by dotted lines in FIG. 2, the nut plate 1 is fitted to the inside of the pillar structure 10. More specifically, the pillar inner panel 11 has two substantially perpendicular inner surfaces 14 and 15, and the nut plate 1 is attached to the pillar structure 10 with the base portion 2 in contact with the inner surface 14 of the pillar inner panel 11 as clearly seen in FIG. 3. The side piece 4 of the nut plate 1 is substantially parallel with the inner surface 15 of the pillar inner panel 11 and is located rearwardly with respect to the anchor nut 3 to which the external load is applied. The nut plate 1 is welded to the stiffener 13 at the flange 5, the first connecting tabs 7a and 7b, and the second connecting tabs 8a and 8b.

Referring to FIG. 3, in case of a car front crash, the external load is applied to the anchor nut 3 in the direction shown by arrow F. The force component $F_1$ which is perpendicular to the base portion 2 of the nut plate 1 acts on the base portion 2 and the pillar inner panel 11. The force on the base portion 2 is then transmitted through the flange 5, the first connecting tabs 7a and 7b and the second connecting tabs 8a and 8b to the stiffener 13. Thus, the external load is distributed to the pillar inner panel 11 and the stiffener 13 so that local deformations or breakage of the pillar inner panel can be substantially avoided. Further, any local deformation of the nut plate 1 under the force component $F_1$ can substantially be suppressed due to the increased rigidity by the side piece 4 and the reinforcing edge 9.

Against the force component $F_2$ which is parallel with the base portion 2, the nut plate 1 remains rigid because the leg portions 6a and 6b increases the strength of the base portion 2 against shear buckling and the second connecting tabs 8a and 8b which are integral with the leg portions 6a and 6b function to reinforce the leg portions 6a and 6b. Any deformations of the nut plate 1 under the force component $F_2$ can be effectively suppressed by the reinforcing effects of the leg portions 6a and 6b.

Figure 4:
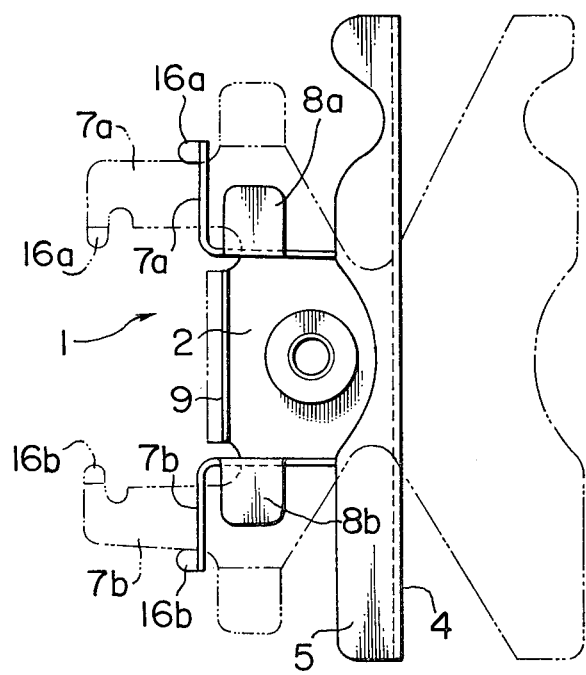
FIG. 4 is a plan view of a nut plate in accordance with another embodiment of the present invention.
Figure 5:
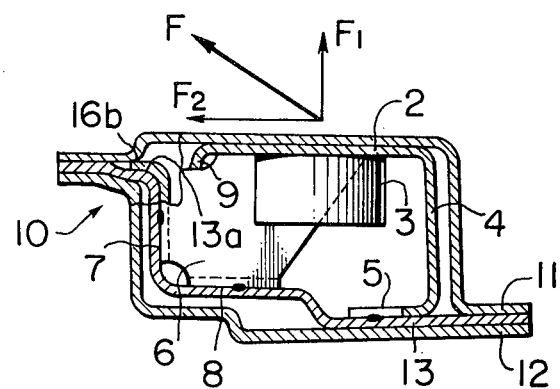
FIG. 5 is a cross-sectional view of a pillar structure on which the nut plate shown in FIG. 4 is installed; and, FIG. 6 is a cross-sectional view similar to FIGS. 3 and 5 but showing a further embodiment.

FIG. 4 shows another embodiment of the present invention in which the structure of the nut plate 1 is substantially the same as that in the previous embodiment so that corresponding parts are designated by the same reference numerals as in FIGS. 1 through 3. In this embodiment, the first connecting tabs 7a and 7b are formed at outer edges with extensions 16a and 16b, respectively. As shown in FIG. 5, the stiffener 13 of the inner pillar 10 is formed with recessed areas 13a and extensions 16a and 16b which are fitted to the recessed areas 13a when the nut plate 1 is installed on the inner pillar 10. The arrangement of this embodiment is considered advantageous in that it is convenient for locating the nut plate 1 on the pillar structure.

Figure 6:
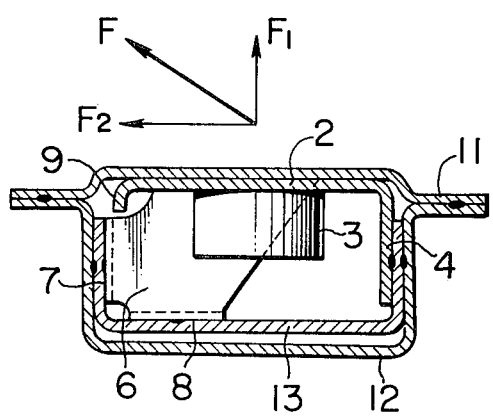

It should be noted that, in the previous embodiments, the flange 5 formed on the outer edge of the side piece 4 is laid on the stiffener 13 to be welded thereto, however, the outer edge portion of the side piece 4 may be bent outwardly to be held between the pillar inner panel 11 and the stiffener 13. Further, as shown in FIG. 6, the pillar structure is constructed of inner and outer panels 11 and 12 of hat-shaped cross-section are welded together, and a stiffener 13, of channel-shaped cross-section, is welded to the outer panel 12, the side piece 4 may be welded directly to the stiffener 13.

The term "pillar structure" as used throughout the specification should be interpreted as including not only the door pillar structure but also an upper side rail which extends along each side of the roof panel, a floor frame extending longitudinally and connected with the lower surface of the floor panel, and a cross frame member extending transversely and connected with the upper surface of the floor panel.

The invention has thus been shown and described with reference to specific embodiments, however, it should be noted that the invention is in no way limited to the details of the illustrated structures but changes and modifications may be made without departing from the scope of the appended claims.

We claim:

1. A seat belt anchor attachment structure for attaching a seat belt anchor to a pillar structure comprised of inner and outer pillar panels which are welded together to form a closed cross-section, said attachment structure including stiffening panel means secured to said pillar structure, a nut carrying plate secured to said stiffening panel means and having anchor attaching nut means provided thereon, said plate having a base portion to which said nut means is attached at one side thereof, a side piece provided along one side edge of said base portion having an angle with respect to said base portion and extending toward said one side of the base portion, said side piece having upper and lower end portions extending beyond upper and lower edges of said base portion, upper and lower leg portions extending from said upper and lower edges of said base portion toward said one side thereof, each of said upper and lower leg portions having a side opposite said side piece where it is provided with a first connecting portion extending substantially in parallel with said side piece, each of said upper and lower leg portions further having an end opposite said base portion where it is provided with a second connecting portion extending substantially in parallel with said base portion, the second connecting portion on said upper leg portion extending in a direction opposite to a direction in which said second connecting portion on said lower leg portion extends, at least said side piece and said first and second connecting portions being secured to said stiffening panel means.

2. A seat belt anchor attachment structure in accordance with claim 1 in which said side piece is located rearwardly of said base portion to which said nut means is attached to receive a load from a seat belt.

3. A seat belt anchor attachment structure in accordance with claim 2 in which said side piece is integral at an outer edge with a flange which extends forwardly substantially in parallel with said base portion.

4. A seat belt anchor attachment structure in accordance with claim 1, in which said side piece extends vertically beyond the confines of said base portion and is of a trapezoidal configuration having a width decreasing from an end adjacent to said base portion.

5. A seat belt anchor attachment structure in accordance with claim 1 in which said leg portions are reduced in width toward their outer ends.

6. A seat belt anchor attachment structure in accordance with claim 1 in which said leg portions are reduced in width toward their outer ends, and said base portion is formed at a side opposite said side piece with a reinforcement edge of relatively small width bent substantially in parallel with said side piece, said first connecting portion being formed with a locating pawl which is adapted to be held between the inner panel and the stiffening panel means of said pillar structure.

7. A seat belt anchor attachment structure in accordance with claim 1 in which said base portion is formed at a side opposite said side piece with a reinforcement edge of relatively small width bent substantially in parallel with said side piece.

8. A seat belt anchor attachment structure in accordance with claim 1 in which said first connecting portion is formed with a locating pawl which is adapted to be held between the inner panel and the stiffening panel means of said pillar structure.

* * * * *